United States Patent [19]

Murphy

[11] Patent Number: 5,148,146
[45] Date of Patent: Sep. 15, 1992

[54] HIGH BRIGHTNESS TELLTALE FOR A HEAD-UP DISPLAY

[75] Inventor: Morgan D. Murphy, Kokomo, Ind.

[73] Assignee: Delco Electronics Corporation, Kokomo, Ind.

[21] Appl. No.: 716,165

[22] Filed: Jun. 17, 1991

[51] Int. Cl.$^5$ ............................................. G02B 27/10
[52] U.S. Cl. ..................... 340/461; 340/705; 340/980
[58] Field of Search ............... 340/461, 462, 705, 980; 362/80.1; 353/14; 359/630, 631, 633

[56] References Cited

U.S. PATENT DOCUMENTS

| | | | |
|---|---|---|---|
| 1,951,783 | 4/1932 | Beard | 250/461.1 |
| 3,593,259 | 6/1971 | Storme | 340/980 |
| 3,648,232 | 3/1972 | White | 340/980 |
| 3,824,535 | 7/1974 | Rover, Jr. | 340/980 |
| 3,848,974 | 11/1974 | Hosking et al. | 350/174 |
| 3,851,304 | 11/1974 | Picardat | 340/980 |
| 4,408,266 | 10/1988 | Sclippa | 362/297 |
| 4,737,896 | 4/1988 | Mochinzuki et al. | 362/301 |
| 4,886,328 | 12/1989 | Iino | 340/980 |
| 4,925,272 | 5/1990 | Ohshina | 350/174 |
| 4,947,305 | 8/1990 | Gunter, Jr. | 362/297 |
| 4,956,759 | 9/1990 | Goldenberg et al. | 362/297 |
| 4,961,625 | 10/1990 | Wood et al. | 350/174 |
| 4,987,410 | 1/1991 | Berman et al. | 340/705 |
| 5,013,135 | 5/1991 | Yamamura | 340/980 X |
| 5,048,927 | 9/1991 | Inoue et al. | 340/705 X |

FOREIGN PATENT DOCUMENTS

| | | | |
|---|---|---|---|
| 0302619 | 2/1989 | European Pat. Off. | 340/705 |
| 0227531 | 12/1984 | Japan | 340/462 |

*Primary Examiner*—Jin F. Ng
*Assistant Examiner*—Brian R. Tumm
*Attorney, Agent, or Firm*—Anthony L. Simon

[57] ABSTRACT

A telltale is sufficiently small and sufficiently bright for use in a head-up display such that the image of the telltale is projected of the combiner, e.g., the vehicle front windshield, and is clearly visible to the vehicle operator, even on bright sunny days. The apparatus includes a housing and a light source. The housing has an inner reflective surface with a focal point outside the housing and an aperture located between the reflective surface and the focal point. A graphics plate is mounted in the aperture. The telltale is highly emissive when light from the light source reflects off of the inner surface and through the aperture.

12 Claims, 2 Drawing Sheets

HIGH BRIGHTNESS TELLTALE FOR A HEAD-UP DISPLAY

This invention pertains to instrumentation displays and more particularly to telltales for automotive head-up displays.

BACKGROUND OF THE INVENTION

Head-up displays have long been used in airplanes to aid the pilots. The head-up display reflects information the pilot needs off of a partial mirror or the windshield, referred to as the combiner, and projects that information at a distance in front of the plane so that the pilot does not have to look into the cockpit to see the information.

More recently, head-up displays have been used in automotive applications. In many of these automotive applications, the image is projected up and reflected off of the vehicle front windshield to appear at a distance in front of the driver. With a head-up display in a vehicle, the driver does not have to adjust his or her eyes from the road to read information, such as vehicle speed, which is normally displayed in the vehicle instrument panel.

Additional information which may be included in the projected display is instrumentation telltale information. Telltale information typically indicates to the vehicle operator the state of different vehicle systems, e.g., the headlight high beams being on, or indicates to the vehicle operator the states of various vehicle parameters, e.g., low fuel, low oil pressure, etc..

The optics for many head-up display systems magnify the projected image, which is the projection of an image source. For implementations in which the projected image is magnified, the image source may be miniature in size, while still projecting a large readable image for the vehicle operator.

In some head-up display systems, the brightness of the projected image is enhanced by projecting the image on a treated combiner or windshield. However, treating the windshield enhances the cost of manufacture of the vehicle. To eliminate the need for a treated windshield, the image source must be made sufficiently bright so that the projected image remains visible to the vehicle operator even on bright sunny days.

SUMMARY OF THE PRESENT INVENTION

This invention provides a high brightness telltale for head-up displays. The high brightness telltale of this invention is miniature in size, is suitable for implementation onto a head-up display image source, and provides a sufficiently bright image that is visible, even on bright sunny days.

Structurally this invention comprises a housing defining a cavity and having an aperture, the housing having an inner reflective surface with a curve, the curve having a focal point outside the housing such that the aperture is located between the curved surface and the focal point, light source mounted within the housing emitting light substantially parallel to a plane of the aperture wherein the light is reflected off of the reflective surface and through the aperture in a manner in which the light is substantially focused at the focal point, and a graphics plate, mounted over the aperture, wherein the graphics plate defines a lit symbol to be projected.

The structure of this invention provides an added packaging advantage in that the light source is mounted orthogonal to the projection path of the projected display. This reduces the necessary depth required by the display source and may be a critical feature in implementations in which packaging space is minimal.

DETAILED DESCRIPTION OF THE INVENTION

Figure 1:
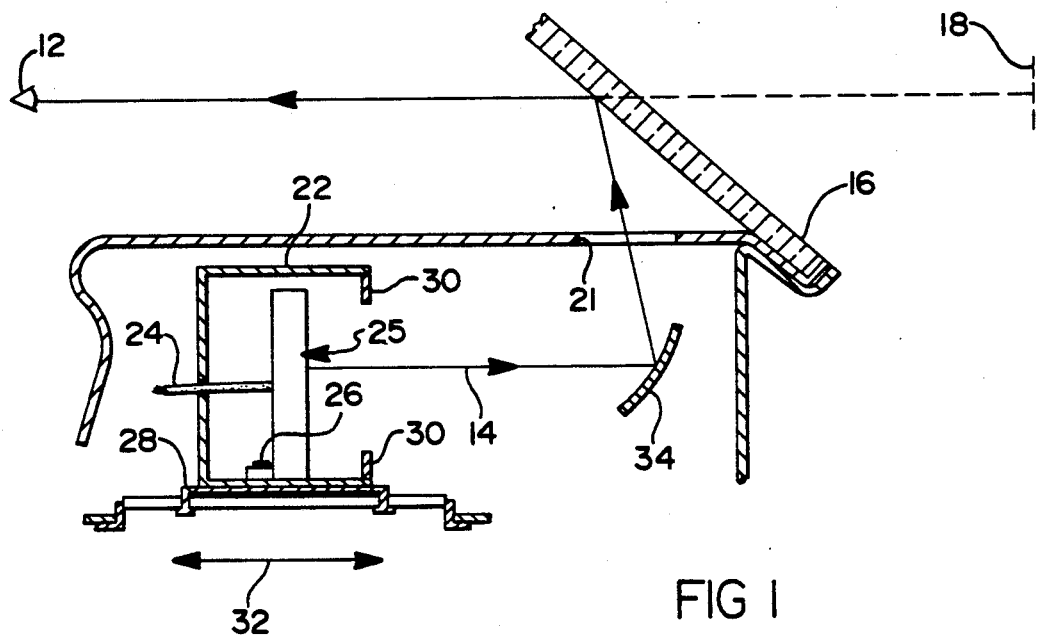
FIG. 1 is a schematic illustration of a typical head-up display system, suitable for implementation of this invention.

Referring to FIG. 1, a head-up display in which this invention may be implemented includes image source 25, optics, such as aspheric mirror 34, and a combiner, such as vehicle windshield 16. The image source 25 projects light along path 14. The light is reflected off of aspheric mirror 34, which projects a first magnified virtual image (not shown) of the display source 25. The projected light travels through an opening 21 in the upper portion of the instrument panel enclosure 20 and is reflected by windshield 16 serving as the combiner. The windshield 16 projects the projected image 18, a virtual image of the first virtual image, preferably at least two meters in front of operator's eye 12. The windshield 16, if curved, may additionally enlarge the projected image. The light travels from windshield 16 along path 14 to the operator's eye 12, which perceives the virtual image 18.

It is preferable that aspheric mirror 34 be shaped to correct for aberrations in projection caused by the aspheric shape of windshield 16. If the windshield 16 is flat or spherical at the point of projection, then the aspheric mirror 34 may, instead, be a spherical mirror. An aspheric mirror that can correct for the aspheric shape of a vehicle windshield is easily designed by one skilled in the art using a ray tracing program such as Code 5 ™, commercially available for licensed use from Optical Research Associates (ORA), Pasadena, Calif.

In this example, the image source 25 includes a high brightness vacuum fluorescent display in combination with at least one telltale of this invention. Alternatively, instead of a vacuum fluorescent display, the image source 25 may include any other type of suitable display, including an LCD display or a well lit analog gauge, such as the type shown in copending U.S. patent application, Ser. No. 07/630,621, filed Dec. 20, 1990, assigned to the assignee of this invention and incorporated into this specification by reference.

The image source 25 is mounted on a mount 28, which is preferably an adjustable mount, and may be included in a housing 22. The housing 22, if used, includes baffles 30 to prevent unwanted light reflections from being projected by the aspheric mirror 34. Cable 24 provides electric signals to the display 25 providing drive signals to the display in a manner suited for the type of display used and well known to those skilled in the art.

Typically, vehicle windshields have first and second reflecting surfaces which tend to reflect first and second images of the image source 25 so that the projected image 18 appears as a double image. It has been found, however, that this double image can be eliminated by taking advantage of a natural wedge found in many vehicle windshields due to manufacturer tolerances. By adjusting the image source 25, along the direction of arrows 32, it is possible, in many instances, to converge an otherwise double image into a single projected image 18.

The adjustable mount 28 may include a slotted base which is movable along a guide bar in the direction of arrows 32. A locking screw 26 is placed in a threaded hole of a support attached to the image source 25 and may be tightened against the guide bar to hold the slotted base and image source 25 in place once it is properly adjusted so that the display image appears clear to the vehicle operator.

Possible variations on the adjustable mount 28 may be desired for different implementations of this invention. For example, instead of having a locking screw as described above, the adjustable mount may be connected to an adjustable lever through a cable assembly so that it may be more easily adjustable by the vehicle operator. Alternatively, the adjustable mount may include a small DC motor and a screw gear so that the adjustment of the image source position can be accomplished through a remote switch. The adjustable mounts described above are just example implementations of this invention and may be replaced by any suitable adjustable mount in which image source 25 is adjustable in the direction of arrows 32, or may even be replaced by a fixed mount.

Mirror 34 may be placed on a pivot mechanism (not shown but easily implemented by one skilled in the art) to adjust the height of the display image so it is viewable to vehicle operators with different eye levels by pivoting the mirror 34 along its longitudinal axis.

The entire apparatus comprising the image source 25, adjustable mount 28, and mirror 34 may be placed within the space usually used by vehicle instrumentation. In such a case, opening 21 is required to allow the display to be projected off of windshield 16. Alternatively, the entire apparatus may be mounted in a housing above the area normally used for vehicle instrumentation. In short, any area of the vehicle suitable for mounting a head-up display apparatus may be used.

Figure 2:
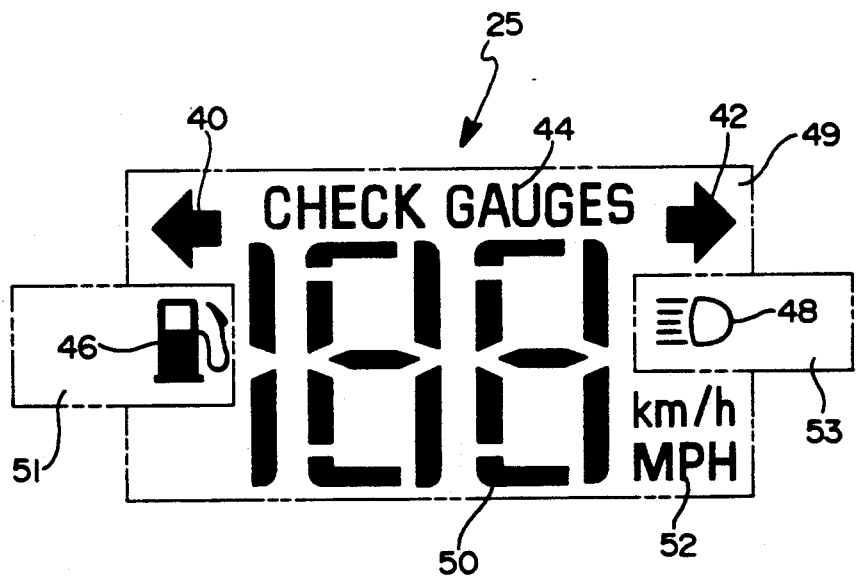
FIG. 2 is an illustration of graphics for the image source shown in FIG. 1, including telltale symbols illuminated by the apparatus of this invention.

Referring to FIG. 2, a sample display source 25 is shown. In this example implementation, components of the display source 25, including turn signals 40 and 42, check gauges indicator 44, digital speedometer 50 and speed scale indicator 52 comprise part of vacuum fluorescent display 49. Low fuel indicator 46 and high beam indicator 48 comprise part of the telltales 51 and 53 according to this invention.

Figure 3:
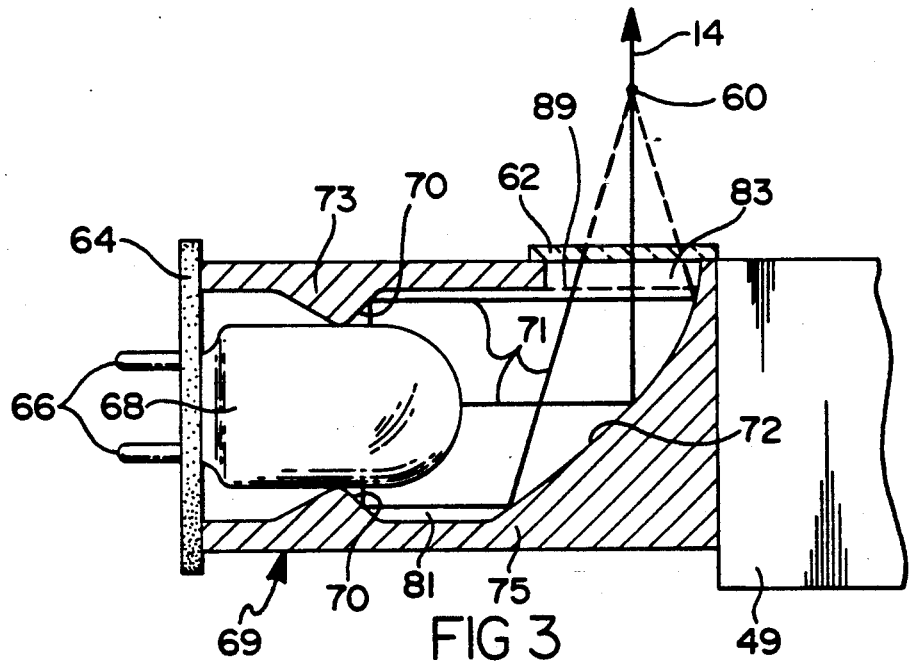
FIG. 3 is a first embodiment of the telltale of this invention.

Referring to FIG. 3, an example telltale of this invention is shown in proximity to vacuum fluorescent display 49. The telltale of this invention shown includes light source 68, which may be a high brightness LED, an incandescent bulb, or any other suitable light source. The light source 68 receives power through terminals 66 and is mounted in housing 69. The housing 69 defines cavity 81 and aperture 83 having a plane parallel to line 89. Light from light source 68 travels along paths 71 through the cavity 81 substantially parallel to the plane 89 of aperture 83 and is reflected off of inner reflective surface 72. Inner reflective surface 72 is preferably curved in a substantially parabolic shape, with the focal point of the parabola 60 outside the housing, such that aperture 83 is between the inner reflective surface and the focal point 60 and such that the reflected light travels through aperture 83.

A graphics plate 62 provides the telltale symbol and is mounted at the aperture 83 so that light traveling through aperture 83 is transmitted through at least part of the graphics plate 62. The light striking the graphics plate is dispersedly transmitted through the graphics plate 62 in a predetermined manner so that the telltale, e.g., 46 or 48 (FIG. 2), is brightly lit and highly emissive. The graphics plate 62 may be constructed of generally translucent plastic with an opaque layer integrated thereon, e.g., a pattern of opaque paint, selectively masking light transmitted through the graphics plate 62 to define the telltale symbol. The graphics plate 62 may include a light filter, either comprising the translucent plastic or bonded thereto, to filter the light from light source 68, if desired. If light source 68 is an LED, filtration may not be necessary.

The housing 69 may be constructed in any suitable manner so long as inner reflective surface 72 is satisfactorily reflective. In the example shown, housing 69 comprises components 64, 73 and 75. The component 64 may be a plastic end and the components 73 and 75 may be machined from aluminum. The inner reflective surface 72 and reflective surfaces 70 are preferably polished for increased efficiency.

As can be seen from the illustration of light paths 71, this invention increases the brightness of the telltale by providing a focusing inner reflective surface 72 placed such that the intensity of the light striking the rear surface of graphics plate 62 is increased over the light intensity striking inner reflective surface 72 and may be greater than the intensity of the light immediately in front of light source 68. In this manner, this invention is an improvement over telltales in which the light striking the graphics plate is focused so that the intensity is necessarily less than or equal to that at the bulb surface.

Figure 4:
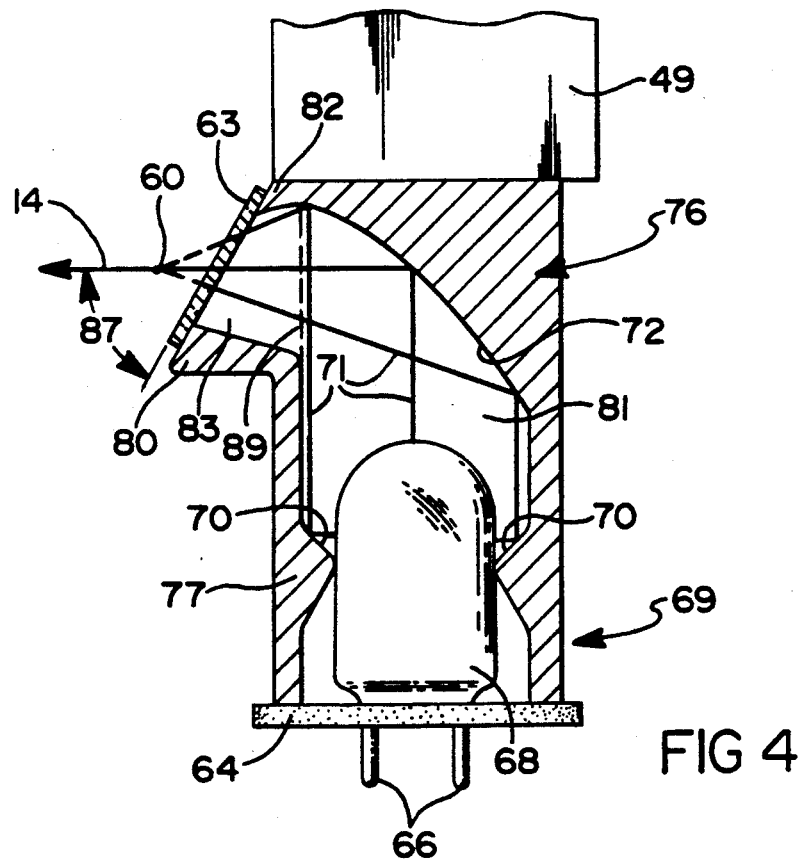
FIG. 4 is a second embodiment of the telltale of this invention.

Referring to FIG. 4, an example implementation of this invention is shown in which the graphics plate 63 projects a telltale in three dimensions. Graphics plate 63 is mounted at an angle 87, less than 90 degrees, so that it is not orthogonal to light path 14. Because the image 18 is a real image of the display source 25, the telltale image (part of image 18) of graphics plate 63 appears to the operator's eye in a plane that is not orthogonal to the operator's line of sight. For example, the graphics plate 63 is to project the high beam indicator 48, the high beam indicator can be made to appear to be pointing in the direction in which the driver is driving. This added depth dimension to the projected display is apparent and pleasing to the vehicle operator as a single millimeter of difference in position of opposite ends of graphics plate 63 can translate into one hundred millimeters or more of projected depth, depending upon the focal length of aspheric mirror 34.

The telltale of this invention 69 shown in FIG. 4 is otherwise similar to that shown in FIG. 3, except the housing 76 includes portions 82 and 80, for mounting the graphics plate 63 at angle 87 in aperture 83.

The above example implementations of this invention are not meant to be limiting in scope and are only the preferred implementations. Variations on the examples shown above, such as different types of optics, e.g., including refractive lenses and separate combiners (instead of windshield 16), may be used with this invention interchangeably with the examples set forth above. Additionally, although it is not preferred, windshield 16 may be coated to enhance reflectivity if so desired.

The high brightness telltale of this invention is shown above in combination with another image source, e.g., the vacuum fluorescent display 49. However, if a system designer desires to project only telltale indications, one or more examples of this invention as shown in FIGS. 3 and/or 4 may be used in combination without any other type of display.

Moreover, various other improvements and modifications to this invention will occur to those skilled in the art and fall within the scope of this invention as set forth below.

The embodiments of the invention in which an exclusive property or privilege is claimed are defined as follows:

1. A head up display apparatus, comprising:
   a head up display housing in which is mounted an image source; and
   a combiner located in a path of light from the image source so that the combiner projects a projected image of the image source perceivable by an operator's eye, wherein
   within the head up display housing, the image source comprises a first high brightness telltale, comprising (a) a telltale housing defining a cavity and an aperture, the telltale housing having an inner reflective surface with a curved shape having a focal point outside the telltale housing such that the aperture is located between the curved surface and the focal point, (b) means for sourcing light mounted within the telltale housing and emitting light, including light which travels substantially parallel to a plane of the aperture wherein the light is reflected off of the inner reflective surface and through the aperture in a manner in which the light has a substantial focus at the focal point, and (c) means for providing a graphics symbol, mounted at the aperture, wherein the graphics symbol is brightly lit to be projected.

2. The apparatus of claim 1, also comprising optics means disposed between the image source and the combiner.

3. The apparatus of claim 1, wherein the combiner is a vehicle windshield.

4. The apparatus of claim 3, also comprising an aspheric mirror disposed between the image source and the vehicle windshield.

5. The apparatus of claim 1, wherein the image source also comprises a second high brightness telltale.

6. The apparatus of claim 5, wherein the image source also includes a vacuum fluorescent display.

7. The apparatus of claim 1, wherein the image source also includes a vacuum fluorescent display.

8. The apparatus of claim 1, wherein the means for sourcing light is an LED.

9. The apparatus of claim 1, wherein the graphics means is mounted at the aperture at an angle to the plane of the aperture so that a projected image of the graphics symbol appears in three dimensions to a vehicle operator.

10. The apparatus of claim 1, wherein the telltale housing comprises a machined aluminum component.

11. The apparatus of claim 10 wherein the telltale housing also comprises a plastic component.

12. A head up display apparatus, comprising:
    a head up display housing to which is mounted an image source; and
    a combiner located in a path of light from the image source so that the combiner projects a projected image of the image source perceivable by an operator's eye, wherein
    mounted to the head up display housing, the image source comprises a high brightness telltale, comprising (a) a telltale housing defining a cavity and an aperture, (b) an inner reflective surface comprising a wall of the cavity, the inner reflective surface comprising a substantially parabolic curve having a focal point outside the telltale housing such that the aperture lies between the inner reflective surface and the focal point, (c) a light source mounted within the telltale housing and emitting light, including light which travels substantially parallel to a plane of the aperture wherein the light is reflected off of the inner reflective surface and through the aperture in a manner in which the light has a substantial focus at the focal point, and (d) a graphics plate mounted at the aperture, wherein the graphics plate defines a brightly lit symbol to be projected.

* * * * *